Aug. 1, 1944. W. L. MOORE 2,354,956
NO SLACK CHAIN COUPLER
Filed April 28, 1943
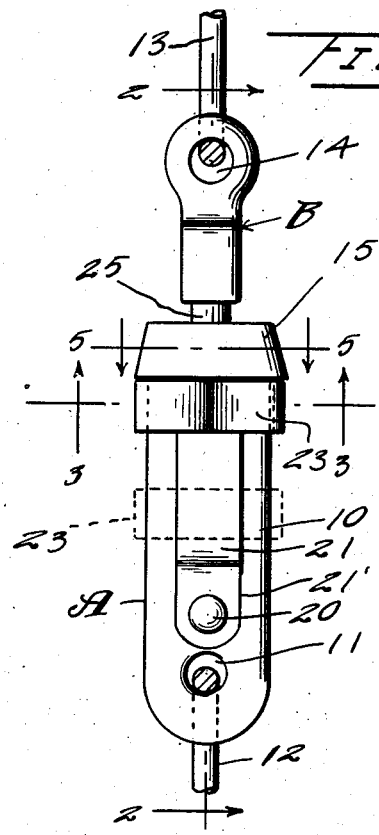
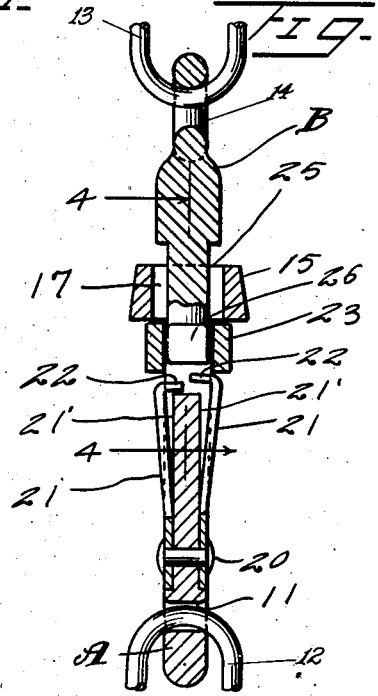
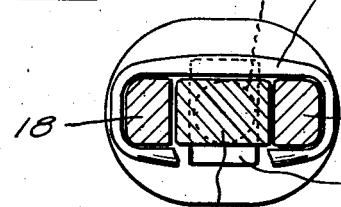
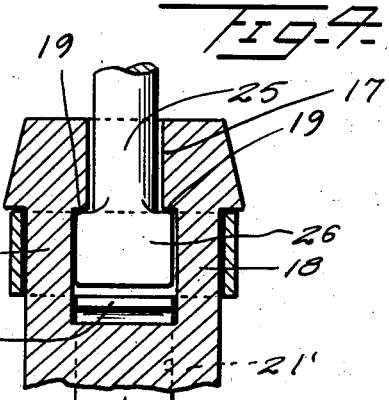
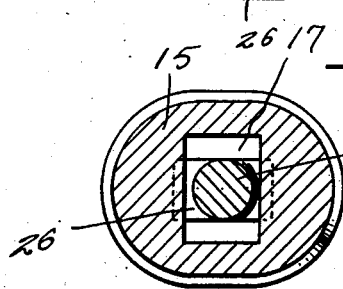
Inventor
W. L. Moore
By L. F. Randolph
Attorney Patented Aug. 1, 1944

2,354,956

UNITED STATES PATENT OFFICE 2,354,956

NO SLACK CHAIN COUPLER

Walter Lytle Moore, Ball, La.

Application April 28, 1943, Serial No. 484,927

4 Claims. (Cl. 59—93)

This invention relates to a coupling for chains, cables, ropes, or the like.

It is particularly aimed to provide a construction whereby the chain, rope, or the equivalent which is coupled or fastened thereby, can be opened or unfastened while the chain is taut and without the necessity of providing slack therein, and a construction which will not open should the chain or the equivalent accidentally become loose or slack.

Such a device will effect material saving in time, will eliminate trouble, and afford increased safety in various arts. For instance, one specific field of use is in connection with binding chains such as are used in logging and hauling, the use of my coupling particularly overcoming unnecessary work incidental to loosening the chain or equivalent, the danger incident thereto, and the danger from movement of released logs or other material incident to loosening or uncoupling the chain.

The more specific objects and advantages will become apparent from a consideration of the description following taken in connection with accompanying drawing illustrating an operative embodiment.

In said drawing:

Figure 1 is a view of the coupling in side elevation, in connection with fragments of chain links;

Figure 2 is a view primarily in section taken approximately on the line 2—2 of Figure 1;

Figure 3 is a cross sectional view taken on the line 3—3 of Figure 1 with a portion of an element removed;

Figure 4 is a longitudinal sectional detail taken on the line 4—4 of Figure 2; and Figure 5 is a cross section taken on the line of Figure 1.

Referring specifically to the drawing wherein like reference characters designate like or similar parts, the coupling consists of detachable sections A and B.

Section A has a body 10 provided with an opening, eyelet, or equivalent means 11 adjacent one end of the appropriate size and shape for attachment of an element 12 thereto which may represent the link of a chain, length of a cable, rope, or any equivalent article whose ends are to be coupled or connected. The other end of such articles is designated 13 and is attached in an eyelet or opening 14 of the section B, the eyelet, opening, or equivalent being of any desired size, shape, or the like according to the article to be coupled.

Said body 10 at its upper end has an integral head 15 provided with a central opening 17 of greater length than width. Between the body 10 proper and the head 15 are struts 18 integral therewith of the same width as the narrower dimension of opening 17 but spaced a distance corresponding to the longer dimension of said opening. The head 15 extends inwardly slightly beyond the struts 18 to form shoulders as at 19. Fastened against opposite faces of the body 10 by a rivet 20 or the equivalent are spring fingers 21 usually of metal, partly occupying depressions 21' in such faces. Such fingers 21 have inwardly extending lugs 22 at their upper ends which extend between the struts 18 below the head to provide shoulders at the upper ends of the fingers 21. Also it will be noted that the fingers 21 are tensioned so as normally to extend outwardly beyond the faces of the body 10, as shown in Figure 2, to support and retain a latch link 23 between the same and the head 15, the latter overlapping the link.

It will be noted that the link 23 is endless and that at the sides it preferably is of increased thickness as at 24, to reinforce the link and avoid any tendency of the same to separate or distort in the event that it is bent from a single strip of material.

Reverting to section B, it has at its inner end an inverted T-shaped portion consisting of a shank 25 capable of turning in opening 17 and a head 26 of approximately the size and shape of said opening 17.

It will be realized that with the slidable link 23 moved away from the head 15, for instance to the position suggested by dotted lines in Figure 1, the head 26 and shank 25 are freely movable into and out of the head through the slot 16, and that by turning the head 26 when inwardly of head 15 to the extent of 90 degrees said head 26 is overlapped by the shoulders 19, thus preventing separation of sections A and B by relative longitudinal movement. Such sections are secured together against accidental separation in the position mentioned by moving the link 23 to the full line position shown in the drawing where it fits and overlaps the head 26 at both sides of the body 10 to prevent turning of section B and the link is held in such latching position in view of its location between the head 15 and the lugs or shoulders 22 as well shown in Figure 2. In order to detach the section B the link 23 is forcibly moved away from the head 15, exerting a cam action on the lugs 22 and forcing the same and the fingers 21 as a whole into the slots or depressions 21', the link thus being passable over the fingers 21 to the dotted line position of Figure 1 so that the head 26 will be exposed and may then be turned 90 degrees and the shank 25 and the head thus aligned with and disposed for withdrawal through the slot 17.

Various changes may be resorted to provided that they fall within the spirit and scope of the invention.

I claim as my invention:

1. A coupling comprising first and second separable sections, said first section having a head provided with an opening, a slidable link on said first section movable against the head to surround a portion of the second section to maintain the sections overlapped, said first section including spring finger means normally supporting the link and preventing movement thereof away from the head, said link being forcibly slidable against the said spring fingers to cause retraction of the latter and to enable release of the second section.

2. A coupling comprising first and second separable sections, said first section having a head provided with an opening, a slidable endless link on said first section movable against the head to surround a portion of the second section to maintain the sections overlapped, said first section including spring finger means normally supporting the link and preventing movement thereof away from the head, and said link being forcibly slidable against the said spring fingers to cause retraction of the latter and to enable release of the second section.

3. A coupling comprising first and second separable sections, said first section having a head provided with an opening, a slidable link on said first section movable against the head to surround a portion of the second section to maintain the sections overlapped, said first section including spring finger means normally supporting the link and preventing movement thereof away from the head, said link being forcibly slidable against the said spring fingers to cause retraction of the latter and to enable release of the second section, said link being of endless form, and at opposite sides thereof being of greater thickness than the remainder.

4. A coupling comprising first and second separable sections, said first section having a head provided with an opening for reception of the second section for turning and overlapping of the first section thereby, said first section having a slidable link thereon movable against the head to surround the second section to maintain the sections overlapped against relative turning, said first section including spring finger means normally supporting the link and preventing movement thereof away from the head, said link being forcibly slidable against the spring fingers to cause retraction of the latter and to enable turning and sliding release of the second section, said finger means comprising fingers disposed on opposite sides of said first section and having inwardly extending lugs at their free ends.

WALTER LYTLE MOORE.